United States Patent [19]

Ullin

[11] 4,347,475
[45] Aug. 31, 1982

[54] OVERVOLTAGE PROTECTION DEVICE MAINLY FOR VEHICLE-BOUND ELECTRONIC EQUIPMENT

[75] Inventor: Ulf Ullin, Vasteras, Sweden

[73] Assignee: ASEA Aktiebolag, Vasteras, Sweden

[21] Appl. No.: 275,788

[22] Filed: Jun. 22, 1981

[30] Foreign Application Priority Data

Jun. 23, 1980 [SE] Sweden ................................ 8004603

[51] Int. Cl.³ ............................................... G05F 5/00
[52] U.S. Cl. ..................................... 323/303; 323/311
[58] Field of Search ................. 361/91, 111, 110, 101; 307/540, 567; 330/298, 207 P; 323/273, 274, 303, 311, 312, 233, 294, 298, 299, 265

[56] References Cited

U.S. PATENT DOCUMENTS 4,103,220 7/1978 Huntley ................................ 323/303

FOREIGN PATENT DOCUMENTS 553748 1/1960 Belgium ............................... 323/303

Primary Examiner—Reinhard J. Eisenzopf
Attorney, Agent, or Firm—Watson, Cole, Grindle & Watson

[57] ABSTRACT

The present invention relates to an overvoltage protection device designed to protect electronic components against high energy transients. The protection device comprises a varistor, across which there is connected a voltage-dividing unit comprising a resistor and a voltage-limiting element, for example a varistor or a Zener diode. The voltage appearing across the voltage-limiting element controls the output signal of the protection device by being connected to the base of a transistor. The input signal to the transistor consists of the input signal of the circuit or the input signal voltage-divided across an input resistor.

5 Claims, 4 Drawing Figures

OVERVOLTAGE PROTECTION DEVICE MAINLY FOR VEHICLE-BOUND ELECTRONIC EQUIPMENT

TECHNICAL FIELD

The present invention relates to an overvoltage protection device, primarily designed to be used for protecting vehicle-bound electronic equipment against high energy transients.

BACKGROUND ART

The electronic systems typically used at the present time will only withstand a voltage of about 40 V. Normally, this will not cause particularly great problems. However, when connecting electronic components to a fixed battery, or the like, one of the cable connections may get detached during operation. This will then give rise to transients with an energy content which is too high for such electronic components. It is thus necessary to protect the components against such transients in some way. An additional demand is that the protection device must not be too bulky since it may have to be accommodated in a small space, for example in a vehicle.

Previously known solutions to similar problems cannot be employed in the cases described above, since the energy content in the transients which can be expected to arise, is too high. In other solutions presented, the voltage level of the residual transients after processing in the protection equipment is still too high to efficiently protect the electronic equipment.

DISCLOSURE OF THE INVENTION

The invention aims to provide a solution to the abovementioned problems and other problems associated therewith.

According to the invention there is provided an overvoltage protection device which comprises, an input to the device, an output from the device, a varistor arranged to have at least a part of an input signal applied to said input appear thereacross, a voltage-dividing unit consisting of a resistor and a voltage-limiting element connected across the varistor, a transistor arranged to receive the voltage appearing at a point between the resistor and the varistor as its imput signal, and the voltage appearing at a point between the resistor and the voltage-limiting element as its base voltage, wherein the output signal of said transistor, which provides the signal appearing on the output of the overvoltage protection device, is arranged to be controlled so that when the voltage of the input signal is below a certain predetermined level, the output and imput signals of the transistor are substantially equal, whereas when the voltage of the input signal is above said predetermined level, the output signal of the transistor is clamped so that it never exceeds the said predetermined level.

By using an overvoltage protection device according to the invention, an efficient, smooth and inexpensive means of protecting the electronic components is provided. By using a connection according to the present invention, a system is provided which is capable of controlling the output voltage within very close limits, without the system being disturbed at a normal level of the input signal. With the small number of components used, such a device is flexible in use, is compact, and is cheap to manufacture.

BRIEF DESCRIPTION OF DRAWINGS

The invention will be described, by way of example, in greater detail with reference to the accompanying drawings, in which.

DESCRIPTION OF PREFERRED EMBODIMENT

Figure 1:
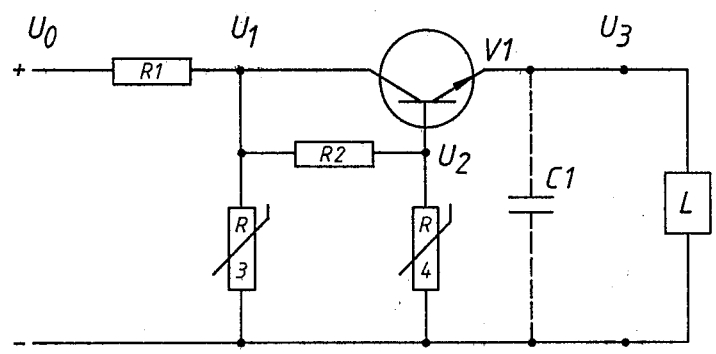
FIG. 1 is the circuit diagram of one embodiment of overvoltage protection device in accordance with the invention.

FIG. 1 shows the overvoltage protection device with its d.c. input on the left and its d.c. output on the right. Electronic equipment to be protected is shown as a load L in FIG. 1. It will be seen that a supply voltage $U_0$ fed to the input is voltage-divided by a resistor R1 and a varistor R3. In those cases where the varistor R3 can absorb the entire energy content of a transient which might arise, the resistor R1 can be dispensed with, since its only function is to absorb part of the input energy. The voltage $U_1$ appearing across the varistor R3 is supplied to the imput of a transistor V1 and in addition, the voltage $U_1$ is further divided by a resistor R2 and a voltage-limiting element R4. The element R4 may, for example, consist of a varistor or a Zener diode. The resistor R2 is dimensioned so that the transistor V1 conducts with as low a voltage drop as possible and so that the component R4 is protected against too high a current/voltage. The voltage $U_2$ at the point between the components R4 and R2 is supplied to the base of the transistor V1 and therefore controls the signal $U_3$ appearing at the output of the projection device.

Figure 2A:
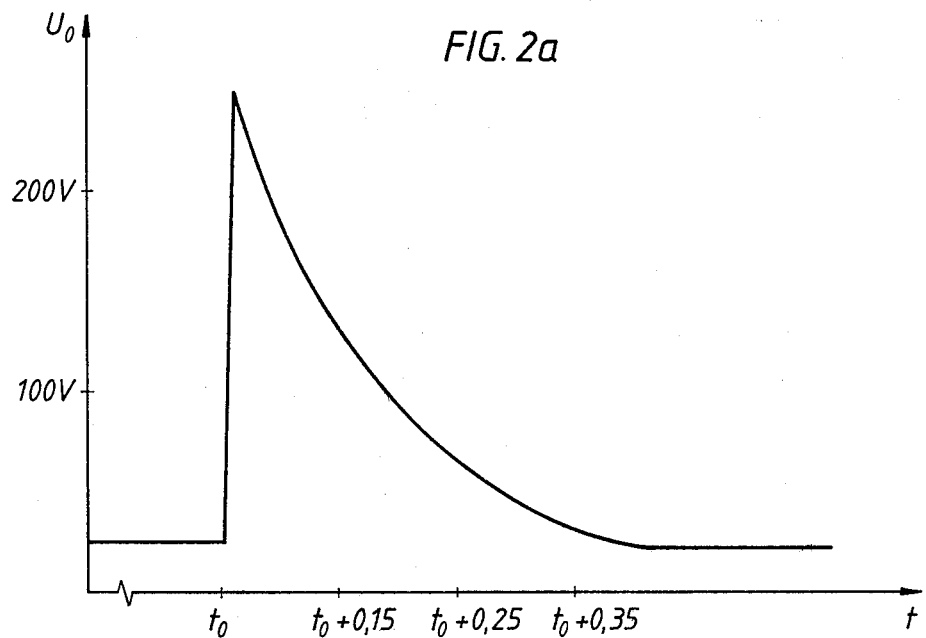
FIGS. 2a, 2b and 2c show some voltage/time curves which may occur in the circuit of FIG. 1.
Figure 2B:
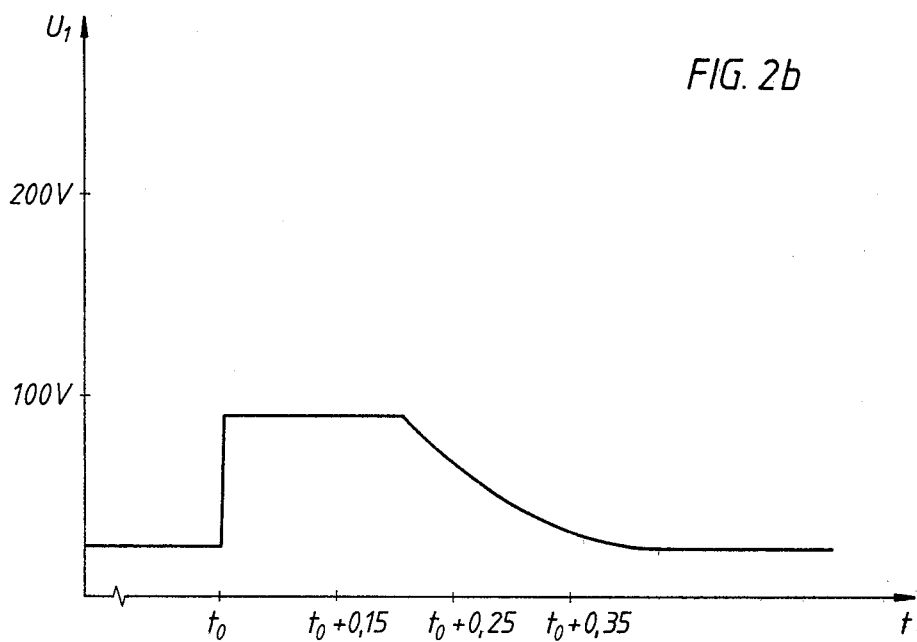
Figure 2C:
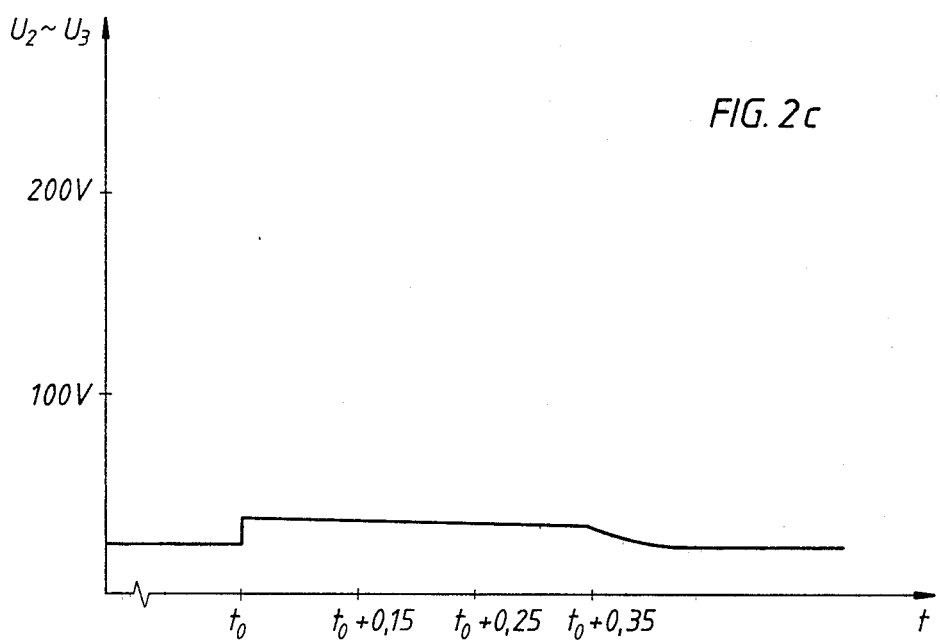

In FIG. 2a, the voltage $U_0$, the d.c. input signal to the circuit of FIG. 1, is shown plotted as a function of time. At the time $t_0$ a transient is assumed to occur which has a duration of about 0.3 seconds and which exceeds 200 V at its peak value. FIG. 2b shows the voltage $U_1$ which appears in the circuit of FIG. 1 as a result of the transient shown in FIG. 2a, again plotted as a function of time. It will be seen that the peak value of $U_1$ is considerably less than the peak value of $U_0$. As shown in FIG. 2b, the peak value is about 90 volts. FIG. 2c shows the voltage $U_2$ which appears in the circuit of FIG. 1 as a result of the transient shown in FIG. 2a, again plotted as a function of time. $U_2$ is approximately equal to the output voltage $U_3$ from the circuit of FIG. 1. It is seen from FIG. 2c that the voltage $U_3$ has a peak value which lies below 40 V, which is the critical value for the subsequent electronic equipment. This value may, of course, be varied when necessary, by changing the dimensioning of the components. The normal level of the supply voltage is 24 V, but also during normal operation is may vary within the range 18-32 V. Thus, the overvoltage protection device is to operate within a very narrow range; it must reduce the peak voltage on the appearance of a transient to below 40 V, but must not interfere with input signals of 32 V or lower.

To withstand a transient such as that shown in FIG. 2a with a peak voltage of 200 volts, an energy content of 200 Watt seconds and with a duration of 0.3 seconds, the components for the circuit of FIg. 1 are chosen, for example, to be the following: R1=4.7Ω 10 W, R2=100Ω ½ W, R3=varistor 47 V 200 Ws, R4=varistor 33 V 1.2 Ws, and V1=transistor 2 N 3055.

These values are merely examples and may be adapted to suit different electronic equipments and supply voltages.

A capacitor C1 shown connected by dashed lines in parallel with the output of the device in FIG. 1 can be employed.

What is claimed is:

1. An overvoltage protection device designed to protect electronic equipment against high energy transients, comprising:

an input to the device, an output from the device, a varistor arranged to have at least a part of an input signal applied to said input appear thereacross, a voltage-dividing unit consisting of a resistor and a voltage-limiting element connected across the varistor, a transistor arranged to receive the voltage appearing at a point between the resistor and the varistor as its imput signal, and the voltage appearing at a point between the resistor and the voltage-limiting element as its base voltage, wherein the output signal of said transistor, which provides the signal appearing on the output of the overvoltage protection device, is arranged to be controlled so that when the voltage of the input signal is below a certain predetermined level, the output and imput signals of the transistor are substantially equal, whereas when the voltage of the input signal is above said predetermined level, the output signal of the transistor is clamped so that it never exceeds the said predetermined level.

2. An overvoltage protection device according to claim 1, in which a resistor is connected in series with the varistor.

3. An overvoltage protection device according to claim 1 or claim 2, in which the voltage-limiting element consists of a varistor.

4. An overvoltage protection device according to claim 1 or claim 2, in which the voltage-limiting element consists of a Zener diode.

5. An overvoltage protection device according to claim 1 or claim 2, in which a capacitor is connected in parallel with the output of the protection device.

* * * * *